(12) United States Patent
Stübbe et al.

(10) Patent No.: US 6,224,660 B1
(45) Date of Patent: May 1, 2001

(54) INK MIXTURE

(75) Inventors: Andreas Stübbe, Aschaffenburg; Wolfgang Lortz, Wächtersbach; Thomas Göbel, Hanau; Holger Glaum, Maintal-Wachenbuchen, all of (DE)

(73) Assignee: Degussa-Huls Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/417,916

(22) Filed: Oct. 13, 1999

(30) Foreign Application Priority Data

Oct. 13, 1998 (DE) .............................................. 198 47 011

(51) Int. Cl.⁷ .................................................. C09D 11/00
(52) U.S. Cl. .................................... 106/31.13; 106/31.27; 106/31.6; 106/287.1
(58) Field of Search ............................. 106/31.13, 31.27, 106/31.6, 287.1

(56) References Cited

U.S. PATENT DOCUMENTS

| | | | | |
|---|---|---|---|---|
| 5,275,647 | | 1/1994 | Winnik | 106/31.59 |
| 5,340,386 | * | 8/1994 | Vincent et al. | 106/31.6 |
| 5,747,562 | * | 5/1998 | Mahmud et al. | 106/31.38 |
| 5,948,835 | * | 9/1999 | Mahmud et al. | 523/215 |

OTHER PUBLICATIONS

Database WPI Section Ch, week 199819 Derwent Publications Ltd., London, GB; Class A97, AN 1998–213025 XP002123418 & JP 10 060348 A (Ricoh KK), 3. Mar. 1998.
Patent Abstracts of Japan vol. 1996, No. 01, Jan. 31, 1996 & JP 07 242093 A (Mitsubishi Pencil Co Ltd.), Sep. 19, 1995.

* cited by examiner

Primary Examiner—Helene Klemanski
Assistant Examiner—Veronica F. Faison
(74) Attorney, Agent, or Firm—Pillsbury Winthrop LLP

(57) ABSTRACT

The ink mixture contains at least one organosilane and optionally at least one hydrophobic silicic acid. The ink mixture can be used as a printing ink, especially as an ink for ink-jet printing.

11 Claims, No Drawings

INK MIXTURE

CROSS-REFERENCE TO RELATED APPLICATION

This application is based on German Application DE 198 47 011.8, filed Oct. 13, 1998, which disclosure is incorporated herein by reference.

FIELD OF THE INVENTION

The invention relates to an ink mixture, a method of its production and to its use.

BACKGROUND OF THE INVENTION

The ink-jet printing process is a known duplicating technology in which the printing ink is transferred without pressure, that is, without contact of the print head with the print medium. Drops of ink whose deflection can be controlled electronically are sprayed out of a jet thereby onto a receiving material. This technology, which is also designated as pressureless printing, is particularly suited for printing products with irregular surfaces and packaging because there is a certain distance between the print head and the material to be printed. The printing process is very flexible. It is relatively economical and is therefore also used in computer printing, e.g., as a workplace printer.

The ink-jet method is also being increasingly used in industry, e.g., for outdoor advertising. In outdoor advertising the ink must meet special requirements as concerns the light-fastness and water resistance. In addition, the chromophoric inking substances must be very fine so that the printing jets do not become clogged. Both dyes and pigments are used as chromophoric substances. The latter have the advantage over dyes that the light-fastness is very high and that they are water-resistant. U.S. Pat. No. 5,085,698 offers a survey of the pigments and dyes used in ink-jet inks.

Pigments have the advantage over water-soluble dyes that they form stable dispersions with a high storage life only on the basis of a treatment with surfactants. According to the current state of the art ink-jet inks are only conditionally water-resistant and can therefore not be readily used in outdoor advertising.

Suggestions have been made for improving the water resistance of ink-jet inks. Thus, ionic or non-ionic surfactants are used for the stabilization of pigments in a dispersion. To this end water-soluble polymers can be used whose concentration is a maximum of 10% relative to the final formulation of the inkjet ink (see EP 0,781,819 A2).

WO 95/04109 describes the use of cyclopolymers for pigment stabilization. Residue groups thereof include a hydrophilic and a hydrophobic group. The hydrophobic group contributes to improvement of the water resistance by means of the water-repellent action. However, polymers have the disadvantage that they sharply raise the viscosity of the ink-jet ink. However, ink-jet inks must have a very low viscosity in order that the ink remains capable of being sprayed. Thus, the used of polymers is very limited.

WO 97/47698 describes a surface modification of pigment black with silanized, hydrophobic silicic acids for improving the water resistance. The silicic acid is sprayed into the pigment black reactor thereby. The retort temperatures are approximately 1800° C., as a result of which the hydrophobing agent is thermally decomposed and loses much of its effect.

U.S. Pat. No. 5,618,338 describes a reactive two-component ink and a corresponding print head. The components, color plus cationic substance, react to provide an ink with an improved water resistance. The lamination of non-water-resistant inks is widespread. The disadvantage of the last-named, known methods is that they are very expensive.

There is therefore the problem of improving the water resistance of ink-jet inks while avoiding the disadvantages of the state of the art.

SUMMARY OF THE INVENTION

The invention has as subject matter an ink mixture which is characterized in that it contains at least one organosilicon compound, such as a silane.

The organosilicon compound can be added to a precursor for producing the aqueous ink mixture or to the finished aqueous ink mixture.

The organosilicon compound can be used in the ink mixture in a concentration of 0.1 to 15% by weight, preferably 0.5 to 2.2% by weight.

For example, silanes or organosilicon compounds known from DE 41 22 263 C1 can be used as silanes.

In particular, the organosilicon compounds can be used in the form of aqueous emulsions containing up to 75% by weight, preferably 1 to 50% by weight of at least one alkoxysilane of the general formula

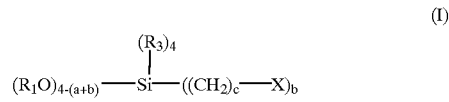

in which $R_1$: $C_1$–$C_3$ alkyl, $R_3$: $C_1$–$C_{20}$ alkyl, straight-chain or branched, preferably $C_1$–$C_{10}$ alkyl, phenyl, X: H, Cl, Br, I, $NH_2$, SCN, CN, $N_3^-$, NHR, $NR_2$, $NR_3$, —$S_x$—, aryl, alkenyl, especially H, Cl, where R has the same definition as $R_3$, set forth above, a: 0, 1 or 2, b: 0, 1 or 2, and (a+b) equals 1 or 2, c: a whole number from 1 to 6 and containing 1 to 20% by weight, preferably 1 to 5% by weight of an organosilicon compound of the general formula

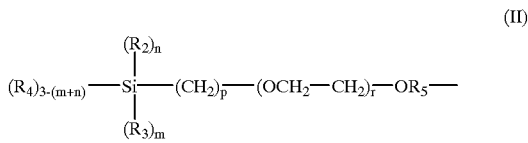

in which $R_2$, $R_3$: the same or different, $C_1$–$C_{20}$ alkyl, straight-chain or branched, preferably $C_1$–$C_{10}$ alkyl, phenyl, $R_4$: $C_1$–$C_3$ alkoxy, or, not more than once only, —[$OCH_2$—$CH_2$]$_r$—$OR_5$, $R_5$: H, $C_1$–$C_{20}$ alkyl, $C_2$–$C_{36}$ alkenyl, $C_5$–$C_8$ cycloalkyl, $C_7$–$C_{36}$ aralkyl, especially benzyl groups and phenyl groups substituted by alkyl groups, m: 0, 1 or 2, n: 0, 1 or 2, with the condition that if p=0, then (m+n)=1 or 2, and if p≠0, then (m+n)=0, 1 or 2, p: 0, 1, 2 or 3, r: a whole number between 1 and 50.

Furthermore, the compound

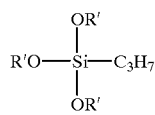

where R' has the same definition as $R_1$, set forth above, known commercially under the name of, for example, BM32, PROTECOSIL 300 E, or Si203 can be used as the silane.

Moreover, the oligomeric compound of this substance can also be used. The oligomer has the structure:

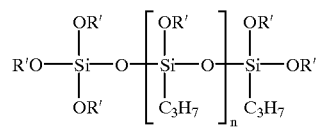

where R' has the same definition as $R_1$, set forth above, and n=0–5.

The oligomer can be used in the form of an aqueous emulsion.

Octyltrimethoxysilane or hexadecyltrimethoxysilane are the preferred silanes.

Use of the aqueous emulsion has the advantage that the organosilicon compound is present in a very finely distributed form and is stabilized by suitable surfactants.

The ink mixture can also contain water and/or solvent.

Examples of the solvent contained in the ink mixture are triethylene glycol, polyvinyl pyrrolidone, methylethylketone, N-methyl-2-pyrrolidone and 1,3-propanediol.

In a preferred embodiment of the invention, the ink mixture can be an aqueous ink mixture containing an aqueous emulsion of a silane.

The aqueous ink mixture can contain the coloring component in the form of a water-insoluble pigment and/or in the form of a water-soluble dye.

Carbon black is preferably used as the water-insoluble pigment.

The ink mixture in accordance with the invention can also contain known additive components. Such components are described, for example., in U.S. Pat. No. 5,596,027.

Further subject matter of the invention includes a method of producing the ink mixture, which method is characterized in that an emulsion of organosilane is mixed into the aqueous pigment mixture optionally containing surfactant.

In order to improve the water resistance, hydrophobic silicic acids can be added to the ink mixture. These silicic acids can be produced by precipitation as well as pyrogenically and can be subsequently rendered hydrophobic in a known manner.

The ink mixture in accordance with the invention can be used as a printing ink and as a writing ink, especially as an ink for ink-jet printing.

The ink mixture in accordance with the invention has the advantage that it has increased water resistance. Drops of water which strike the dry surface of the ink form a bead very strongly and do not penetrate into the ink.

DETAILED DESCRIPTION OF THE PREFERRED EMBODIMENTS

EXAMPLES

The inks used in Examples 1–7 are produced as follows:

1. Production of an aqueous pigment black dispersion containing 15% pigment in which 7% (relative to the total amount) of a non-ionic surfactant mixture is added for stabilization. The pigment black and the surfactant mixture previously dissolved in deionized water are first homogenized in an Ultra-Turrax for 20 minutes and subsequently dispersed in a bead mill. The pigment black used in the black dispersion is color black SW 18, a product of Degussa-Hüls AG.

2. Production of the silane emulsion according to DE 41 22 263, page 7.

3. Water, triethylene glycol and the silane emulsion are mixed in a magnetic agitator and the pigment black dispersion added. The mixing time is 10 minutes. Table 1 lists the compositions of the inks used in the Examples. The concentration of pigment is 5% in each example.

TABLE 1

| | (all data in %) | | | | | | |
|---|---|---|---|---|---|---|---|
| Example | 1 | 2 | 3 | 4 | 5 | 6 | 7 |
| Pigment Black dispersion | 30.0 | 30.0 | 30.0 | 30.0 | 30.0 | 30.0 | 30.0 |
| Triethylene glycol | 13.5 | 13.5 | 13.5 | 13.5 | 13.5 | 13.5 | 13.5 |
| Distilled Water | 46.5 | 45.6 | 44.7 | 39.3 | 45.6 | 44.7 | 39.3 |
| Silane emulsion 1 | | 0.9 | 1.8 | 7.2 | | | |
| Silane emulsion 2 | | | | | 0.9 | 1.8 | 7.2 |

Silane emulsion 1 contains 50% triethoxyoctylsilane and silane emulsion 2 contains 50% triethoxyhexadecylsilane.

The inks are applied with a coating applicator, K Control Coater (Erichsen Company), with a wet film thickness of 6 μm onto paper. The water resistance is determined with a drop test. Demineralized water is applied with a disposable syringe in drop form onto the printed surface. The drops are visually evaluated after 15, 30, 45 and 50 sec, wiped to the side with a finger and the wear evaluated. Two commercial, coated papers are used. Paper 1 has a very compact coating 50 μm thick and a very smooth surface. Paper 2 has a very loose, uneven coating 5–15 μm thick.

Example 1

Paper 1: 15 sec.: The drop penetrates immediately into the paper, slight wear 30 sec.: The drop has dried.

Paper 2: Result as for paper 1

Example 2

Paper 1: 15 sec.: The drop is flat, runs slowly, slight wear 30 sec.: As above, the drop is not dry 45 sec.: As above 60 sec.: As above Paper 2: Result as for paper 1

Example 3

Paper 1: 15 sec.: The drop is flat, runs slower than in Example 2, slight wear 30 sec.: As above, the drop is not dry 45 sec.: As above 60 sec.: As above Paper 2: Result: The drop gradient is steep, otherwise as for paper 1

Example 4

Paper 1: 15 sec.: The drop gradient is steep and does not run, slight wear 30 sec.: As above 45 sec.: The drop penetrates readily into the ink layer, slight wear 60 sec.: As above Paper 2: Result as for paper 1

Example 5

Paper 1: 15 sec.: The drop gradient is steep, does not penetrate into the ink layer, slight wear 30 sec.: The drop penetrates readily into the ink layer, slight wear 45 sec.: The drop penetrates more deeply into the ink layer, slight wear 60 sec.: As above Paper 2: The drop does not penetrate into the ink layer until after 45 seconds, otherwise as above

Example 6

Paper 1: Result as for Example 5

Example 7

Paper 1: 15 sec.: The drop gradient is steep, does not penetrate into the ink layer, slight wear 30 sec.: The drop penetrates readily into the ink layer, slight wear 45 sec.: Result as for 30 sec.

60 sec.: Result as for 30 sec.

Paper 2: The drop does not penetrate into the ink layer until after 45 sec., otherwise as for Paper 1.

The ink mixture in accordance with the invention, which contains an organosilane emulsion, provides a distinct delay in the penetration of the drop of water into the ink layer. The Silane emulsion 2 (triethoxyhexadecylsilane) has a distinctly better water-repellent behavior than the Silane emulsion 1 (triethoxyoctylsilane). The influence of the paper coating is slight.

In Examples 8–10 a hydrophobic, pyrogenically produced silicic acid is added to the ink-jet ink.

TABLE 2

(all data in %)

| Example | 8 | 9 | 10 |
|---|---|---|---|
| Pigment Black dispersion | 33.3 | 33.3 | 33.3 |
| Isopropanol | 20.0 | 20.0 | 20.0 |
| Distilled Water | 56.7 | 56.2 | 55.7 |
| AEROSIL R 972 | | 0.5 | 1.0 |

With a concentration of 1% hydrophobic, pyrogenically produced silicic acid the drop of water no longer penetrates into the ink layer. A distinct improvement of the water resistance is achieved. The effect is more pronounced on paper 2 than on paper 1.

Systems containing solvent are investigated in Examples 11–18. No aqueous silane emulsions are used in these formulations. SI 108 and SI 116 can be readily dissolved in the solvents used.

TABLE 3

(all data in %)

| Example | 11 | 12 | 13 | 14 | 15 | 16 | 17 | 18 |
|---|---|---|---|---|---|---|---|---|
| Ink black FW 18 | 5.0 | 5.0 | 5.0 | 5.0 | 5.0 | 5.0 | 5.0 | 5.0 |
| Polyvinyl-pyrrolidone | 4.0 | 4.0 | 4.0 | 4.0 | 4.0 | 4.0 | 4.0 | 4.0 |
| Methylethylene ketone | 16.0 | 30.0 | 30.0 | 30.0 | 30.0 | 30.0 | 30.0 | 30.0 |
| Triethylene glycol | 40.0 | 30.0 | 29.5 | 28.0 | 26.0 | 29.5 | 28.0 | 28.0 |
| N-methyl-2-pyrrolidone | 20.0 | 20.0 | 20.0 | 20.0 | 20.0 | 20.0 | 20.0 | 20.0 |
| 1,3-propane diol | 15.0 | 11.0 | 11.0 | 11.0 | 11.0 | 11.0 | 11.0 | 11.0 |
| Silane SI 108 | | | 0.5 | 2.0 | 4.0 | | | |
| Silane SI 116 | | | | | | 0.5 | 2.0 | 4.0 |

Silane SI 108: Octyltrimethoxysilane
Silane SI 116: Hexadecyltrimethoxysilane

Example 11

15 sec.: The drop runs strongly, slight wear 30 sec.: As above 45 sec.: The drop runs more strongly, slight wear 60 sec.: As above

Example 12

15 sec.: The drop does not run and remains round, slight wear 30 sec.: The drop runs readily, otherwise as above 45 sec.: As above 60 sec.: The drop runs readily, somewhat flatter, slight wear

Example 13

15 sec.: The drop does not run, remains round and spherical, slight wear 30 sec.: As above 45 sec.: The drop runs readily, otherwise as above 60 sec.: As above

Example 14

15 sec.: The drop does not run, remains round and spherical, slight wear 30 to 60 sec.: As above

Example 15

15 sec.: The drop does not run, remains round and spherical, slight wear 30 to 60 sec.: As above

Examples 16 to 18

Same results as Example 15

Octyltrimethoxysilane displays good water-repellent properties when added in an amount of 2%.

Hexadecyltrimethoxysilane provides good properties when added in an amount of only 0.5% and is, therefore, preferred.

What is claimed is:

1. An aqueous ink mixture, comprising at least one organosilane in the form of an aqueous emulsion.

2. The ink mixture according to claim 1, further comprising at least one hydrophobic silicic acid.

3. An ink mixture comprising at least one organosilane and at least one hydrophobic silicic acid which is produced pyrogenically.

4. A method of producing the ink mixture according to claim 1, comprising:

mixing an emulsion of the organosilane and optionally at least one hydrophobic silicic acid produced pyrogenically into an aqueous pigment mixture optionally containing surfactant.

5. A method of producing the ink mixture according to claim 1, comprising:

mixing an emulsion of the organosilane and optionally at least one hydrophobic silicic acid produced pyrogenically into an aqueous pigment mixture optionally containing surfactant.

6. A method for using the ink mixture according to claim 1, comprising:

applying the ink mixture to a substrate.

7. A method for using the ink mixture according to claim 1, comprising:

applying the ink mixture to a substrate.

8. A method according to claim 6, comprising:

applying the ink mixture as an ink in ink-jet printing.

9. A method according to claim 7, comprising:

applying the ink mixture as an ink in ink-jet printing.

10. A method according to claim 6, comprising:

applying the ink mixture as a writing ink.

11. A method according to claim 7, comprising:

applying the ink mixture as a writing ink.

\* \* \* \* \*